United States Patent
Kimblad

(10) Patent No.: US 10,744,564 B2
(45) Date of Patent: *Aug. 18, 2020

(54) ADDITIVE MANUFACTURING METHOD, METHOD OF PROCESSING OBJECT DATA, DATA CARRIER, OBJECT DATA PROCESSOR AND MANUFACTURED OBJECT

(71) Applicant: Digital Metal AB, Höganäs (SE)

(72) Inventor: Hans Kimblad, Höganäs (SE)

(73) Assignee: DIGITAL METAL AB, Höganäs (SE)

( * ) Notice: Subject to any disclaimer, the term of this patent is extended or adjusted under 35 U.S.C. 154(b) by 236 days.

This patent is subject to a terminal disclaimer.

(21) Appl. No.: 15/532,090

(22) PCT Filed: Jan. 11, 2016

(86) PCT No.: PCT/EP2016/050360
§ 371 (c)(1),
(2) Date: May 31, 2017

(87) PCT Pub. No.: WO2016/113212
PCT Pub. Date: Jul. 21, 2016

(65) Prior Publication Data
US 2017/0312822 A1    Nov. 2, 2017

(30) Foreign Application Priority Data
Jan. 14, 2015   (GB) .................................. 1500607.5

(51) Int. Cl.
*B22F 3/105* (2006.01)
*B33Y 10/00* (2015.01)
(Continued)

(52) U.S. Cl.
CPC ............ *B22F 3/1055* (2013.01); *B22F 3/008* (2013.01); *B22F 3/1021* (2013.01); *B22F 5/10* (2013.01);
(Continued)

(58) Field of Classification Search
CPC .............................................. B22F 2003/1058
See application file for complete search history.

(56) References Cited

U.S. PATENT DOCUMENTS

| 5,198,159 A | 3/1993 | Nakamura et al. |
| 5,595,703 A | 6/1997 | Swaelens et al. |

(Continued)

FOREIGN PATENT DOCUMENTS

| DE | 202013010638 U1 | 6/2014 | |
| GB | 2520596 A | 5/2015 | |
| JP | 2005171299 A * | 6/2005 | ............ B22F 3/1055 |
| JP | 2005171299 A | 6/2005 | |
| WO | 2015029006 A1 | 3/2015 | |

OTHER PUBLICATIONS

JP-2005171299-A machine translation (Year: 2005).*
(Continued)

*Primary Examiner* — Colleen P Dunn
*Assistant Examiner* — Sean P. O'Keefe
(74) *Attorney, Agent, or Firm* — Lowe Graham Jones PLLC

(57) ABSTRACT

The present disclosure provides an additive manufacturing method for manufacturing an object. The method comprises depositing successive layers of a granular metal construction material. The method comprises selectively binding a first region of each layer to form a bound shell of the construction material defining an exterior of the object by depositing a binder into the first region surrounding a second region that remains unbound. The method comprises separating the shell and the enclosed unbound construction material from the construction material remaining outside the shell. The (Continued)

present disclosure also provides apparatuses implementing the manufacturing method, and objects manufactured by the manufacturing method.

12 Claims, 8 Drawing Sheets

(51) Int. Cl.
    *B22F 3/00*     (2006.01)
    *B29C 64/165*     (2017.01)
    *B22F 3/10*     (2006.01)
    *B22F 5/10*     (2006.01)
    *B29C 64/153*     (2017.01)
    *B33Y 50/02*     (2015.01)
    *B33Y 80/00*     (2015.01)
    *B29C 64/393*     (2017.01)
    *B23K 26/34*     (2014.01)
    *B29C 64/40*     (2017.01)
    *B29K 505/00*     (2006.01)

(52) U.S. Cl.
    CPC ............ *B23K 26/34* (2013.01); *B29C 64/153* (2017.08); *B29C 64/165* (2017.08); *B29C 64/393* (2017.08); *B33Y 10/00* (2014.12); *B33Y 50/02* (2014.12); *B33Y 80/00* (2014.12); *B22F 2003/1057* (2013.01); *B22F 2003/1058* (2013.01); *B29C 64/40* (2017.08); *B29K 2505/00* (2013.01); *Y02P 10/295* (2015.11)

(56) References Cited

U.S. PATENT DOCUMENTS

| | | | |
|---|---|---|---|
| 6,375,874 B1* | 4/2002 | Russell | B29C 41/12 |
| | | | 264/28 |
| 2010/0228369 A1 | 9/2010 | Eggers et al. | |
| 2014/0349132 A1* | 11/2014 | Uhlmann | B22F 3/1055 |
| | | | 428/596 |
| 2015/0080495 A1* | 3/2015 | Heikkila | B29C 64/106 |
| | | | 523/223 |

OTHER PUBLICATIONS

International Search Report and Written Opinion for PCT/EP2016/050360 dated Apr. 26, 2016, 14 pages.
Notice of Rejection dated Apr. 22, 2019 for co-pending Taiwanese Patent Application No. 105100594; 4 pages; English translation 2 pages.
Search Report for priority application GB1500607.5, dated Sep. 7, 2015, 5 pages.
Rochus et al, "New Applications of Rapid Prototyping and Rapid Manufacturing (RP/RM) Technologies for Space Instrumentation", Acta Astronautica, vol. 61 (2007); p. 352-359 (8 pages).
Taiwanese Office Action; dated Dec. 20, 2018; 10 pages.
Chinese Office Action dated Oct. 23, 2019 with English summary for co-pending Chinese Patent Application No. 201680005726.1; pp. 27.
Japanese Office Action dated Jan. 7, 2020 with English summary for co-pending Japanese Patent Application No. 2017-535767; pp. 10. All pages relevant.

* cited by examiner

ADDITIVE MANUFACTURING METHOD, METHOD OF PROCESSING OBJECT DATA, DATA CARRIER, OBJECT DATA PROCESSOR AND MANUFACTURED OBJECT

PRIORITY CLAIMS

This invention claims priority to PCT Application Serial No. PCT/EP2016/050360 filed Jan. 11, 2016, which claims priority to Great Britain Application Serial No. 1500607.5 filed Jan. 14, 2015. The contents of which are hereby incorporated by reference.

TECHNICAL FIELD

The present disclosure relates to an additive manufacturing method, and particularly to an additive manufacturing method in which a granular material, such as a metal powder, is deposited in layers into a build region, portions of each layer being bound together during or after deposition of each layer to form portions of an object, thereby forming the object in the build region from the series of layers. The bound portions of each layer of the object are typically also bound to bound portions of the previous layer such that the object is formed in a contiguous fashion through the successively deposited layers. The binding is typically carried out by selective deposition of a binder. The present disclosure also relates to a method of processing object data for use in such a method, and data carrier and object data processor for performing the method of processing object data. The present disclosure also relates to apparatuses implementing the manufacturing method, and objects manufactured by the manufacturing method.

BACKGROUND

Additive manufacturing methods, in which an object is built up by binding portions of a construction material together to form the object, are widely considered as providing an important and advantageous alternative to traditional subtractive manufacturing methods, in which an object is formed by removing portions of material to define the surface of the object.

In many varieties of additive manufacturing, a construction material is deposited into a build region as a series of layers, portions of each layer being bound together and being also bound together with previously-bound portions of the layer below, in order to build up an object to be manufactured. One particular class of additive manufacturing, often termed 3D printing, involves the deposition of sequential layers of granular material into a build region, and the selective joining of portions of the layers together, either after or during the deposition of each layer, by the selective application of a liquid binder from, for example, an ink-jet head arranged to travel across the deposited layer and arranged to selectively deposit binder at desired locations on each deposited layer.

Where the engineering requirements for the object to be manufactured do not mandate a high degree of strength in the object, it may be sufficient to consider the manufacturing of the object as having been finished after the process of depositing the binder into sequential layers of granular construction material is complete. Such manufactured objects obtain their mechanical engineering properties principally from the binding strength between the particles of the granular construction material resulting from the presence of the binder. However, relying on the binder to adhere the particles one to another generally results in a low strength and a consequent tendency of the object to easily fracture.

Accordingly, one class of 3D printing technologies uses a granular construction material, such as a metal or non-metal powder, which is subsequently sintered under suitable conditions such as the application of increased temperature or pressure. Especially, objects made from metal powders as the granular construction material can be sintered, for example by heating to a temperature below the melting point of the metal, to achieve an object with substantially improved mechanical properties.

However, when sintering objects made from a granular construction material which, prior to the sintering, includes binder binding the granules of the granular construction material one to another to form the object, the presence of binder coating the granules can interfere with the sintering process and can lead to a subsequent reduction in advantageous mechanical properties, such as hardness and compressive and tensile strength, as compared with parts formed by sintering an equivalent pure granular construction material which does not include any binder.

Accordingly, there exists a need to provide methods and apparatus which are capable of improving the mechanical properties of objects manufactured by such techniques.

SUMMARY

According to a first aspect of the present disclosure, there is provided an additive manufacturing method for manufacturing an object. The method comprises depositing successive layers of a granular metal construction material. The method comprises selectively binding a first region of each layer to form a bound shell of the construction material defining an exterior of the object by depositing a binder into the first region surrounding a second region that remains unbound. The method comprises separating the shell and the enclosed unbound construction material from the construction material remaining outside the shell.

In one implementation, at least 50%, at least 60%, at least 70%, at least 80%, at least 90% or at least 95% of the volume enclosed by the shell is unbound in the manufactured object.

In one implementation, the shell is contiguous and substantially or completely defines the exterior of the object.

In one implementation, the method further comprises, after the shell and the enclosed construction material is separated from the construction material remaining outside the shell, debinding the bound regions of construction material in a debinding process conducted at a first temperature, the first temperature being below a melting point of the construction material.

In one implementation, the first temperature is no more than 90%, no more than 80%, no more than 70% or no more than 60% of the melting point of the construction material.

In one implementation, the method further comprises elevating the shell and the enclosed construction material to a second temperature in a sintering process at which the shell and the enclosed construction material sinters together to form the object, the second temperature being higher than the first temperature.

In one implementation, the second temperature is no more than 90%, no more than 80%, or no more than 70% of the melting point of the construction material.

In one implementation, the elevating of the shell and the enclosed construction material to a second temperature at which the shell and the enclosed construction material sinters together occurs after debinding the bound regions of construction material in the debinding process.

In one implementation, the debinding process is carried out in one of air, a reducing atmosphere, an oxidizing atmosphere, an inert atmosphere, or a catalytic atmosphere, and/or at a pressure below 800 mBar.

In one implementation, the method comprises curing the binder.

In one implementation, the metal is selected from a pure metal or alloy, the pure metal or alloy having greater than 50%, greater that 60%, greater than 70% or greater than 80% iron, titanium, gold, copper, silver or nickel by mass.

In one implementation, the metal is selected from a pure metal or alloy, the pure metal or alloy having a hexagonal close packed crystal structure.

In one implementation, the binder is air-curable, heat-curable or UV-curable.

In one implementation, the shell has a thickness less than less than 2mm, 1mm, less than 0.5mm, less than 0.25mm, or less than 0.125mm.

According to a second aspect of the present disclosure, there is provided an object manufactured in accordance with the method of the first aspect.

According to a third aspect of the present disclosure, there is provided a method of processing object data. The method comprises obtaining object data representing an object to be manufactured. The method comprises identifying a surface portion of the object to be manufactured. The method comprises generating shell data based on the identified surface portion, the shell data representing a shell portion of the object to be manufactured extending inwardly from the identified surface portion. The method comprises outputting the generated shell data.

According to a fourth aspect of the present disclosure, there is provided a data carrier carrying program instructions configured, when executed, to cause a data processor to perform a method in accordance with the third aspect.

According to a fifth aspect of the present disclosure, there is provided an object data processor. The object data processor comprises an object data obtaining unit operable to obtain object data representing an object to be manufactured. The object data processor comprises a surface portion identifying unit operable to identify a surface portion of the object to be manufactured. The object data processor comprises a shell data generating unit operable to generate shell data based on the identified surface portion, the shell data representing a shell portion of the object to be manufactured extending inwardly from the identified surface portion. The object data processor comprises a shell data outputting unit for outputting the generated shell data.

According to a sixth aspect of the present disclosure, there is provided an additive manufacturing method for manufacturing an object. The method comprises depositing successive layers of a construction material. The method comprises selectively binding first regions of each layer to form a bound shell of construction material defining an exterior of the object. The method comprises selectively binding second regions of each layer to form support portions contacting the shell and which function to internally support the shell against external forces.

In one implementation, regions of each layer extending between the first regions and the second regions remain substantially unbound.

In one implementation, the shell is contiguous and substantially or completely defines the exterior of the object.

In one implementation, the first regions are bound by a method selected from: local sintering, local melting, deposition of liquid binder or local photopolymerisation.

In one implementation, the second regions are bound by a method selected from: local sintering, local melting, deposition of liquid binder or local photopolymerisation.

In one implementation, the first regions and the second regions are bound by a common binding method.

In one implementation, the first regions and the second regions are bound by respectively different binding methods.

In one implementation, the first regions and the second regions are bound such that the first regions are relatively more strongly bound than the second regions.

In one implementation, the first regions are bound with a greater volume of liquid binder per unit layer area than the second regions.

In one implementation, the support portions have the form of columns of bound material extending across and within the shell.

In one implementation, the support portions have the form of a three-dimensional mesh of bound material extending across and within the shell.

In one implementation, the mesh comprises a regular and repeating unit structure.

In one implementation, the mesh comprises an irregular structure.

In one implementation, the method further comprises separating the shell and the enclosed construction material from the construction material remaining outside the shell.

In one implementation, the method further comprises elevating the shell and the enclosed construction material to a first temperature at which the shell and the enclosed construction material sinters together to form the object.

In one implementation, the method further comprises, after the shell and the enclosed construction material is separated from the construction material remaining outside the shell and before the shell and the enclosed construction material is elevated to the first temperature, debinding the bound regions of construction material in a debinding process conducted at a second temperature lower than the first temperature.

According to a seventh aspect of the present disclosure, there is provided a method of processing object data. The method comprises obtaining object data representing an object to be manufactured. The method comprises identifying a surface portion of the object to be manufactured. The method comprises generating shell data based on the identified surface portion, the shell data representing a shell portion of the object to be manufactured extending inwardly from the identified surface portion. The method comprises generating support portion data based on the identified surface data, the support portion data representing support portions contacting the shell which function to internally support the shell against external forces. The method comprises combining the support portion data and the shell data to obtain combined data representing the shell and the support portions arranged within the shell. The method comprises outputting the combined data.

According to a eighth aspect of the present disclosure, there is provided a data carrier carrying program instructions configured, when executed, to cause a data processor to perform a method in accordance with the seventh aspect.

According to a ninth aspect of the present disclosure, there is provided an object data processor. The object data processor comprises an object data obtaining unit operable to obtain object data representing an object to be manufactured. The object data processor comprises a surface portion identifying unit operable to identify a surface portion of the object to be manufactured. The object data processor comprises a shell data generating unit operable to generate shell data based on the identified surface portion, the shell data representing a shell portion of the object to be manufactured extending inwardly from the identified surface portion. The object data processor comprises a support portion data generating unit operable to generate support portion data based on the identified surface data, the support portion data representing support portions contacting the shell which function to internally support the shell against external forces. The object data processor comprises a combining unit operable to combine the support portion data and the shell data to obtain combined data representing the shell and the support portions arranged within the shell. The object data processor comprises a combined data outputting unit for outputting the combined shell data.

According to a tenth aspect of the present disclosure, there is provided an object manufactured by the method according to the sixth aspect.

BRIEF DESCRIPTION OF THE DRAWINGS

For a better understanding of the present disclosure, and to show how the same may be carried into effect, reference will be made, by way of example only, to the accompanying Drawings, in which.

DETAILED DESCRIPTION

Figure 1:
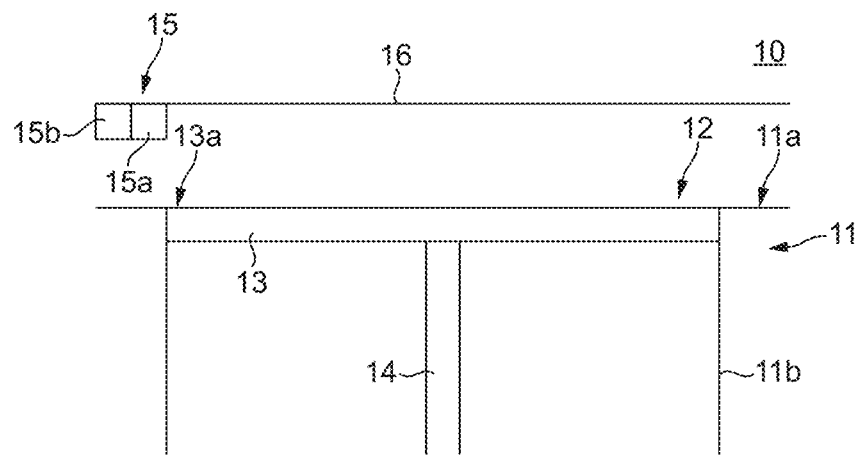
FIGS. 1 to 6 represent steps in an additive manufacturing process.

FIG. 1 shows a manufacturing apparatus in which the concept of the present disclosure may be implemented. The apparatus 10 of FIG. 1 has a table 11 with an upper surface 11a. Here, upper surface 11a is planar. Set into the surface 11a of table 11 is a recessed well 12, the sides of which are defined by side walls 11b extending in a perpendicular direction from the surface 11a of the table. Arranged in well 12 and having an extent in the plane of the surface of the table (XY plane) matching that of the well is support plate 13. Support plate 13 also has a planar upper surface 13a and is movably arranged in well 12 such that the depth of the well in a direction (Z direction) perpendicular to the surface 11a of table 11 such that the depth of the well, between surface 11a of table 11 and surface 13a of support plate 13 is variable. For example, support plate 13 may be movable by means of a piston 14, which is adapted to raise and lower support plate 13 in accordance with instructions from a control unit (not shown) of the apparatus.

Although FIG. 1 is drawn in cross-section (cross-section in the XZ plane), the well, table and plate all have extension in the direction into the page (Y direction). For example, the well 12, and accordingly the support plate 13, may be rectangular, square, circular, oval, or may have some other shape when viewed in a direction perpendicular to the surface 11a of table 11, that is, into the well.

Of course, although the surface of table 11 is here disclosed as planar, the surface may be curved or inclined, and in some configurations may be slightly inclined upwardly or downwardly away from the well.

Above the surface of table 11, a print head 15 is arranged to translate in at least the X direction. For example, rail 16 may be provided, extending in the X direction, along which print head 15 may be arranged to translate by means of, for example, pulleys, rack-and-pinion drive, or worm screw drive. Print head 15 may be movable under the control of a control unit of the apparatus. Print head 15 here has two dispensing components, a construction material deposition unit 15a which is arranged to deposit a granular construction material into well 12 as the print head 15 traverses well 12, and a binder deposition unit 15b, arranged to dispense a binder, such as a liquid binder, at selected locations in well 12 as the print head 15 traverses well 12 to bind portions of the previously-deposited granular construction material together.

Each of construction material deposition unit 15a and binder deposition unit 15b may be coupled to an appropriate material reservoir, each of which may be provided as part of print head 15, or may be arranged at another part of apparatus 10, or may be externally provided.

Print head 15 may be arranged to translate only in one direction (X direction), forward and reverse, across well 12, or may also be arranged to translate in another direction at an angle, for example a perpendicular direction (Y direction), to the first direction.

In the present configuration, print head 15 is arranged to travel only in one direction (X direction) above well 12. To allow construction material deposition unit 15a to deposit the granular construction material across the full width of well 12 in a direction perpendicular to the translation direction of print head 15 (Y direction), the construction material deposition unit 15a may have extent in a direction perpendicular to the direction of travel of print head 15 (Y direction) the same as or larger than the maximum width direction of well 12 and may provide one or more construction material deposition positions from which construction material may be dispensed under control of the control unit so as to deposit an even layer of powder across the width of the well. For example, construction material deposition unit 15a may have a single large dispense orifice in the shape of a slit extending across the full width of well 12, or may be provided with several smaller dispense orifices arranged in an array across the width of well 12, being sufficiently closely spaced so as to deposit an even layer of powder into the well.

By such configurations, as print head 15 traverses along rail 16 across well 12, a substantially uniform layer of powder may be dispensed into the well, the thickness of which may be determined by the rate at which the granular construction material is dispensed from the construction material deposition unit 15*a* and by the speed at which print head 15 traverses well 12.

Print head 15 may also be provided with a smoothing device, such as a doctor blade or smoothing roller, which may be arranged behind the construction material deposition unit 15*a* relative to a forward direction (X direction) in which print head 15 moves while dispensing construction material from construction material deposition unit 15*a* so as to smooth any irregularities in the depth of the layer of construction material deposited during that movement. The smoothing unit may be retractable relative to print head 15, or may be fixed in height relative to the surface 11*a* of table 11 or relative to the height of the one or more dispensing orifices of construction material deposition unit 15*a*.

Binder deposition unit 15*b* is arranged behind construction material deposition unit 15*a* relative to the direction of travel in which print head 15 travels while depositing construction material from construction material deposition unit 15*a*. Binder deposition unit 15*b* is adapted to selectively deposit binder at various locations in in well 12 so as to bind portions of previously deposited construction material together to form joined regions in a deposited layer.

In the present configuration, binder deposition unit 15*b* is an ink-jet type print head arranged to jet droplets of binder according to commands from the control unit of the apparatus. Binder deposition unit 15*b* may provide a set of orifices extending across the width direction of well 12 at a predetermined spacing, each of which being individually controllable so as to selectively deposit binder at different positions across a deposited layer as the print head 15 traverses across well 12 along rail 16. In another configuration, binder deposition unit 15*b* may only have one or a smaller number of orifices from which binder may be jetted, and may be arranged to translate across print head 15 in a direction perpendicular to the direction of travel of print head 15 across well 12. In the first configuration, the position at which binder is deposited is determined by the orifice which is activated to deposit binder and the position of print head 15 across well 12, while in the second configuration the position of binder deposition unit 15B across the width direction of well 12 also determines the location at which binder is deposited.

In some configurations, the print head 15 makes a first pass from an initial position across well 12 in which a layer of construction material is deposited, followed by a return to the initial position and then a second pass in the same direction in which binder is deposited onto the previously-deposited layer. In another configuration, the construction material is deposited from construction material deposition unit 15*a* and binder is selectively deposited from binder deposition unit 15*b* in the same pass, before the entire layer has been deposited. The latter of these two configurations is adopted in the following, although the former is an alternative implementation.

If the binder deposited by the binder deposition unit unit 15B requires no specific curing treatment, for example, if the binder cures on contact with air or if the binder is formed by the combination of two simultaneously or subsequently jetted components which together react and cure, no additional curing unit is required. However, the binder may, for example, be radiation curable, and may require the application of, for example, ultraviolet light to harden and cure the binder. In such a configuration, print head 15 may include a curing unit arranged behind that binder deposition unit in a forward direction in which the print head 15 moves when depositing binder, so that binder deposited by the binder deposition unit 15*b* may be cured by the application of UV light from the curing unit. In the present configuration, it is assumed that the binder which is used requires no curing unit, and accordingly no curing unit is shown.

In a further possible configuration, the binder is heat-curable, and the printing apparatus may be configured to raise the temperature of the well to bake and cure the binder.

The movement of the print head, the activation of the construction material deposition unit, and the activation and control of the binder deposition unit may all be individually controlled by the control unit of the apparatus such that a uniform layer of powder may be deposited as the print head traverses well 12, and selected regions of that layer may be bound together to form bound regions of the layer.

In general, the thickness of the layer is controlled such that the binder jetted by the binder deposition unit 15*b* will not only penetrate the full thickness of the layer, and thus bind the full thickness of the layer together, but will also penetrate through to the layer below sufficient to bind the bound portions of a layer with the bound portions of an underlying layer. If thicker layers are to be deposited, the control unit may increase the quantity of binder deposited per area of deposited layer, and may reduce the quantity if thinner layers are to be deposited.

Figure 2:
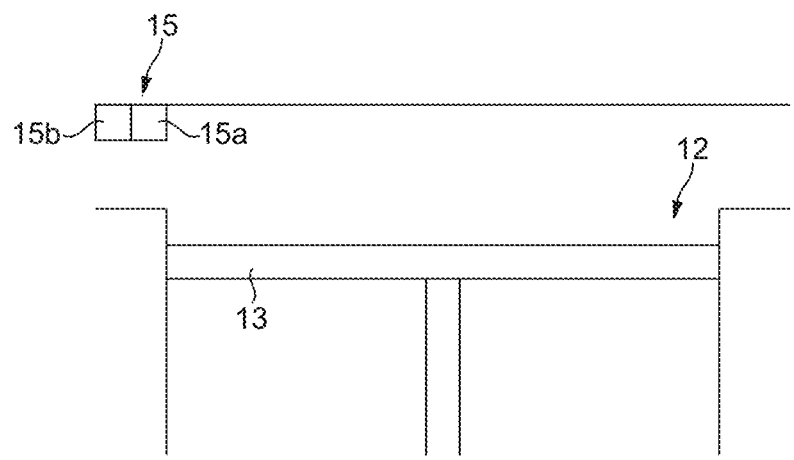
Figure 3:
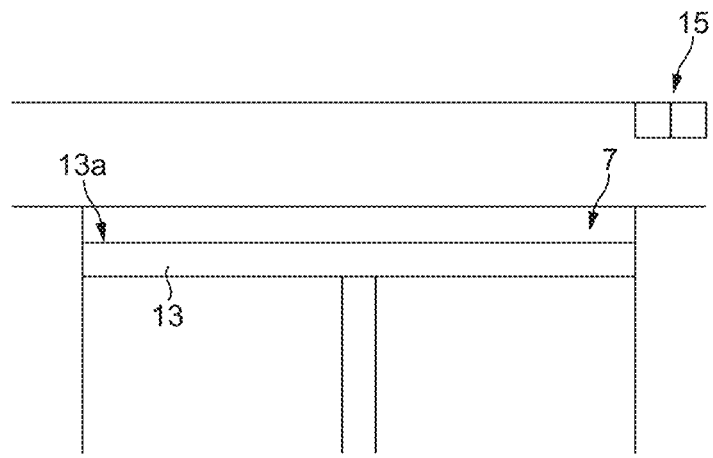
Figure 4:
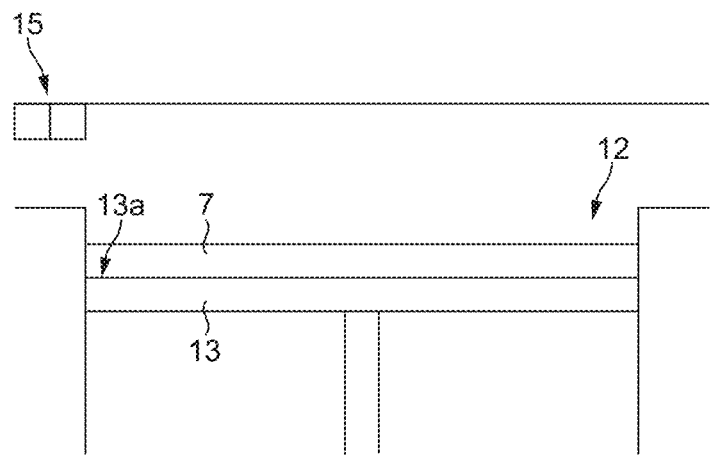

In the configuration shown in FIG. 2, support plate 13 has been lowered from surface 11*a* by at least the thickness of one layer of construction material to be deposited. From the position shown in FIG. 2, print head 15 traverses well 12 and deposits a layer of construction material from the construction material deposition unit 15*a* while binding portions of the deposited layer together with binder deposited from the binder deposition unit 15*b*. This results in the configuration shown in FIG. 3, in which a layer 7 of construction material having portions selectively bound together is located in well 12 on upper surface 13*a* of support plate 13, and in which print head 15 is now on an opposite side of the well to the starting position shown in FIG. 2. From the position shown in FIG. 3, print head 15 returns to the starting position as shown in FIG. 2, and support plate 13 is further lowered by the thickness of another layer, as shown in FIG. 4. Subsequently printed layers may have the same thickness as the first layer, or may have different thicknesses. In the present configuration, it is assumed that all layers have the same thickness, for simplicity.

Figure 5:
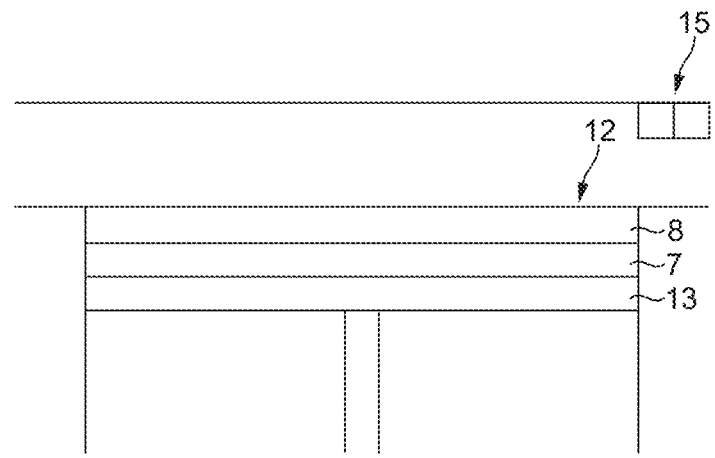
Figure 6:
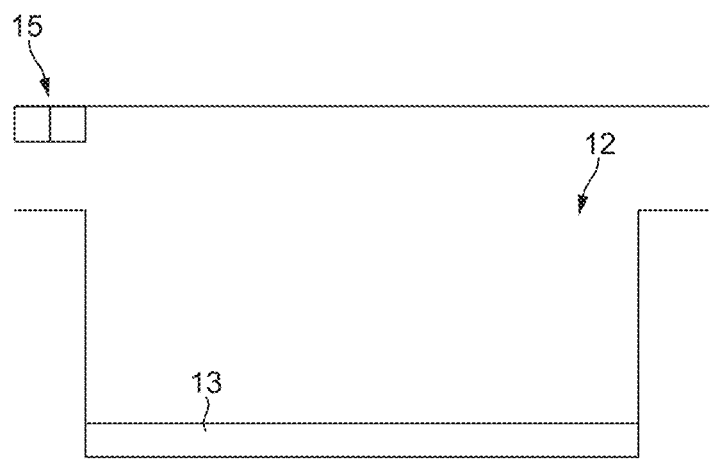

From the configuration shown in FIG. 4, a further pass of print head 15 is made across well 12 so as to deposit a further layer 8 on top of layer 7 in well 12 as described in connection with the transition from FIG. 2 to FIG. 3, as shown in FIG. 5. Portions of layer 8 are joined together and the binder sufficiently penetrates layer 8 so as to join the joined portions of layer 8 to joined portions of layer 7 lying directly below. The process in the transition from FIG. 4 to FIG. 5 is then repeated for a desired number of layers, the number and thickness of layers and locations on each layer at which binder is deposited being controlled according to a design for the object to be produced. Eventually, a the final layer is printed, and optionally after a baking process to cure the binder, the printed object is removed from well 12 resulting in the configuration shown in FIG. 6. From this configuration, support plate 13 may be raised by piston 14 to achieve the configuration shown in FIG. 1, from which point printing may again begin.

Control of manufacturing apparatus 10, and specifically control as to at least the locations on each layer at which binder is deposited is conducted by a control unit (not shown) according to a predetermined set of manufacturing instructions which define the object to be manufactured.

Typically, for an apparatus as shown in FIG. 1, the manufacturing instructions define a series of successive slices through the object to be manufactured, each slice representing a single layer to be deposited together with information as to the locations on each layer at which binder is to be deposited and therefore at which the granules making up the layer are to be joined together. Such information can be provided, for example, as a set of deposition vectors on successive XY planes, or alternatively, as a set of pixel images of sequential XY planes. In some configurations, the control unit may be configured to accept object definition information in other formats and to control the apparatus 10 to produce objects defined by such data by appropriately processing the object data into data defining a series of layers. For example, an object may be defined by CAD data defining the object as a set of surfaces enclosing regions of the object which are to be bound together, as a composite structure formed from a set of geometrical primitives, or as voxel data on a 3D raster grid. To handle such representations, the control unit may divide the object to be manufactured as represented by the object data into a series of planes or slices, and may then determine the locations on each plane or slice at which binder is to be deposited to form the object to be manufactured.

Figure 7:
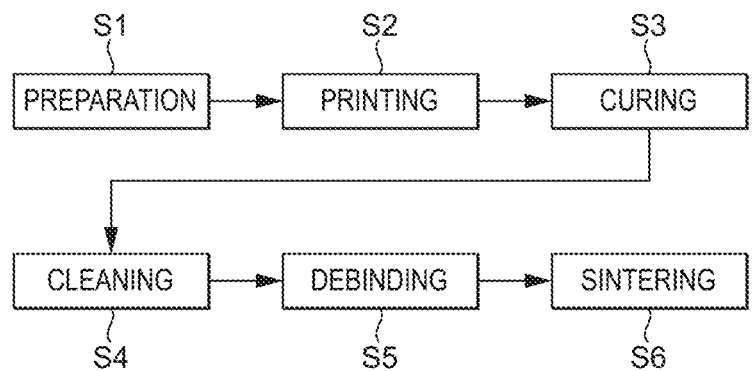
FIG. 7 shows a flow chart for an additive manufacturing process.

The manufacturing process shown in FIGS. 1 to 6 and implemented by the manufacturing apparatus may be part of a larger manufacturing process as shown in FIG. 7. In the process shown in FIG. 7, the printing process shown in FIGS. 1 to 6 is represented as step S2. Prior to the printing process, the granular construction material used in the printing process may be prepared in a preparation step, for example may be cleaned to remove surface impurities, or may be surface treated to activate the surface so as to better bind with the applied binder. Such preparation process is indicated in FIG. 7 of step S1.

Following the printing process, if curing of the binder did not occur during the printing process, the binder may be cured, for example by heating the object to a curing temperature in step S3. Such a step may be carried out in the well of the manufacturing apparatus or elsewhere. Next, the object may be cleaned to remove excess unbound powder from the external surface of the object, for example using liquid or gas jets and/or vibration to remove the excess construction material in step S4.

Next, a debinding step may be performed, indicated as step S5, in which the temperature of the object is raised, and/or an appropriate atmosphere is applied, so as to evaporate or decompose the binder. For example, depending on the binder or the powder, debinding can occur at an elevated temperature lower than the sintering temperature, or may occur at room temperature. For example, the debinding temperature may be no more than 90%, no more than 80%, no more than 70% or no more than 60% of the melting point of the construction material. Debinding can be carried out, for example, under an air atmosphere, a low vacuum, such as less than 800 mBar, a moderate vacuum, such as less than 1 mBar, or a high vacuum, such as less than 0.001 mBar, a reactive atmosphere such as catalytic atmosphere, an oxidising atmosphere or a reducing atmosphere, or an inert atmosphere such as nitrogen or argon. Oxidising atmospheres can include oxygen gas. Catalytic atmospheres can include nitric acid. Reducing atmospheres can include hydrogen gas. The choice of debinding conditions will depend on the binder used and the composition of the construction material, and can be optimised by those skilled in the art by straightforward experiment.

Finally, in step S6, the object may be heated to an elevated temperature and maintained at that temperature such that the granular construction material sinters together, in step S6. Steps S5 and S6 may be carried out at the same location, for example in a thermal treatment chamber, or elsewhere. A sintering temperature may be, no more than 90%, no more than 80%, or no more than 70% of the melting point of the construction material In configurations according to the present disclosure, rather than binding the entirety of regions which are to be solid in the finished product, a shell surrounding such regions is deposited, with the interior of the regions left substantially unbound.

Figure 8:
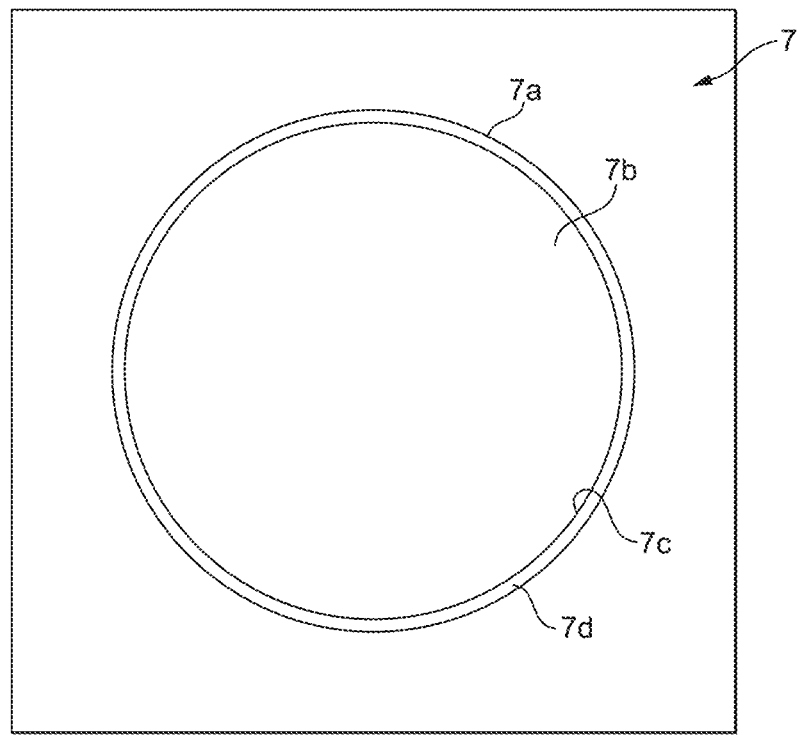
FIG. 8 represents one deposited and selectively bound layer in an additive manufacturing process.

In prior approaches, a cylindrical or spherical object has been manufactured by sequentially depositing a series of layers having circular regions bound together on each layer, such that the bound portions of each layer, stacked and joined together between the layers, form the cylindrical or spherical object. With reference to FIG. 8, which shows in plan view one such layer 7, a circular region 7b lying within a circular border 7a would be bound together. However, the present inventors have considered that by adopting such an approach, even using a debinding step such as debinding step S5 of FIG. 7, it may be difficult for binder located in interior portions of the manufactured object far from any surface of the object to exfiltrate the object or, if the debinding step involves decomposing the binder, for the decomposition products of the binder to exfiltrate. Without wishing to be bound by any particular theory, it is believed that remaining binder or binder decomposition products remaining in the interior of the manufactured object prior to the sintering step may inhibit the interaction between the surfaces of the granules of the construction material during the sintering process, and thus can cause weaknesses in the manufactured object.

Accordingly, according to the present disclosure, rather than applying binder at every location on each layer which isassociated with an interior of the object to be printed, the configurations of the present disclosure apply binder at least to a shell region extending inwardly from the surface of the object to be manufactured which encloses substantially unbound powder. For example, at least 50%, at least 60%, at least 70%, at least 80%, at least 90% or at least 95% of the volume enclosed by the shell may be unbound in the manufactured object.

With regard to each layer, this is achieved, as shown in FIG. 8 by, rather than binding the whole interior 7b of an external surface 7a, only binding a relatively thin border region extending from exterior surface 7a to interior surface 7c, such that substantially unbound powder makes up the intended interior of the object. When manufacturing a sphere or a cylinder, according to FIG. 8, the bound region 7d defined between exterior surface 7a and interior surface 7c of the shell may form an annulus 7d. However, when other shapes are printed, the bound border region 7d may have another appropriate shape. In some circumstances, the border region 7d may have a maximum and a minimum thickness, or may haver a substantially uniform thickness extending, for example, normal to the exterior surface 7a of the object. For example, the shell may have a thickness less than 2mm, 1mm, 0.5mm, 0.25mm, or 0.125mm.

By adopting a configuration as shown in FIG. 8, once the process shown in FIGS. 1 to 6 is complete, a result will be an object having a bound external shell surrounding unbound powder in an interior of the object. The thickness of the shell may be approp riately adjusted so as to give sufficient strength to the object to allow handling and cleaning before the object is given its final manufactured strength by the eventual sintering process.

Figure 9:
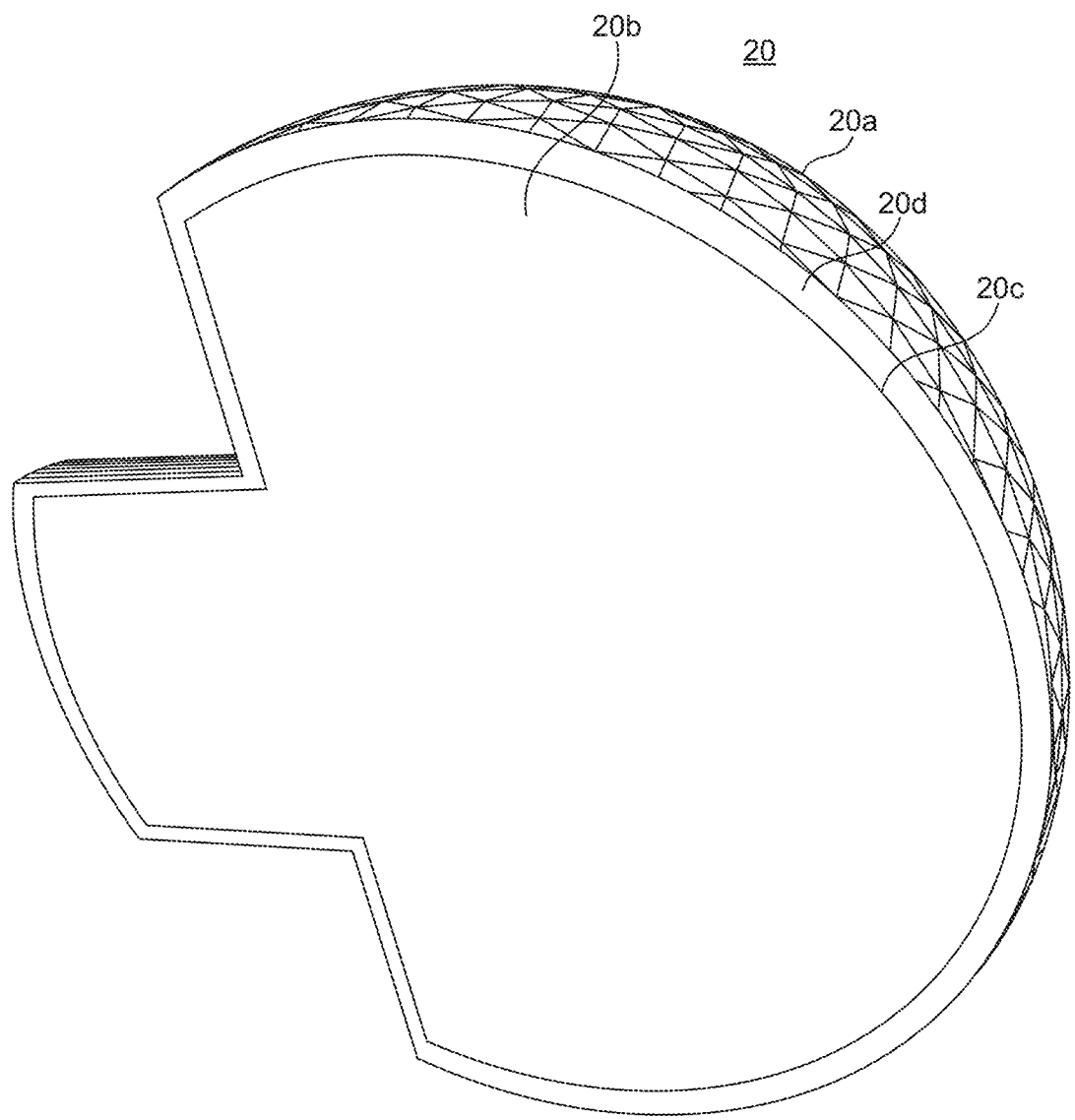
FIG. 9 represents a manufactured object according to a disclosed additive manufacturing process which has been divided to reveal the interior of the same.

A result of the process shown in FIGS. 1 to 6 according to the present disclosure may be seen in FIG. 9, in which a manufactured object 20, depicted as though it had been sectioned in the plane of one of the layers 7, 8 from which the object was formed, is seen to have an external shell portion 20d extending between an outer surface 20a of the object and an inner surface 20c of the shell, inside which shell 20d substantially unbound powder is found in region 20b. Debinding and sintering such an object as described in connection with FIG. 7, or even sintering such an object without the debinding step having been performed, can result in a far stronger sintering bond, especially in the interior of the object at which no binder was provided. Therefore, much improved mechanical properties may be achieved as compared with an object in which binder was present at all final solid portions of the object.

In order that the object can be cleaned and handled before being sintered, it is preferred that the shell 20d may be substantially contiguous, i.e. have no holes formed therein. However, for some classes of powder, it may be acceptable to allow small holes in a mesh-type shell, with the packing of the powder during manufacture being sufficient as to prevent the powder of the interior unbound regions from falling through the holes during handling.

One class of construction materials for which the concepts of the present disclosure have advantageous application are pure metal or alloys which have greater than 50%, greater that 60%, greater than 70% or greater than 80% iron, titanium, gold, copper, silver or nickel by mass.

One class of construction materials for which the concepts of the present disclosure have advantageous application are pure metal or alloys which have a hexagonal close packed crystal structure.

Experimental studies have confirmed that the manufactured objects according to the present disclosure are significantly improved as compared with the prior art approach. For example, FIGS. 10A and 10B illustrate comparative results of one such experiment.

Two cubic parts were produced by binding a powder of 316L steel with an air-hardening binder. In a process according to prior practice, the entire cubic structure was bound with binder during the manufacturing process. In an example according to the present disclosure, a cubic shell of thickness 1 mm was printed to surround substantially unbound powder. The particle size was approximately 15 micron, and, following printing, both structures were subject to debinding in air at 350° C. and sintered at 1370° C.

Samples were taken from the center of both structures following sintering.

Figure 10A:
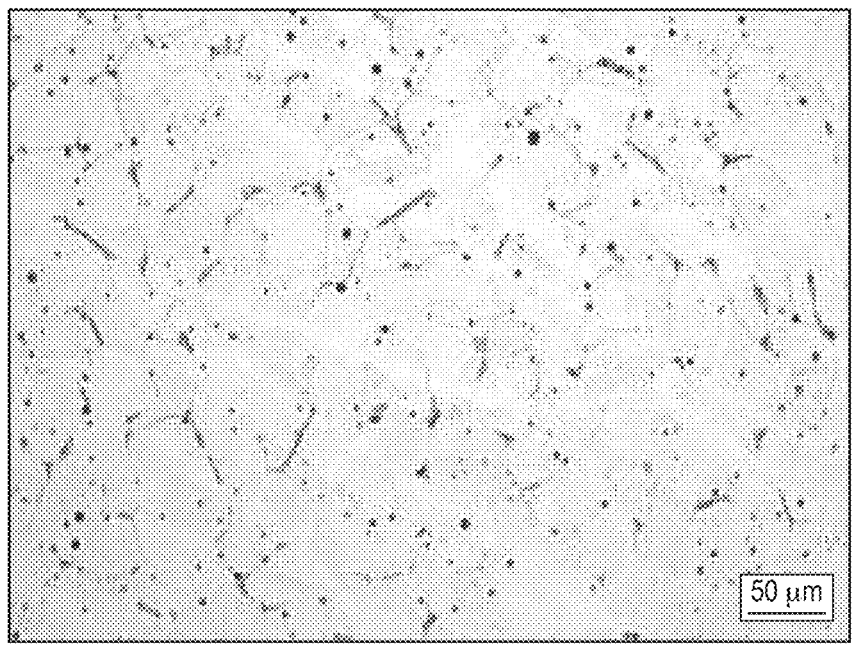
FIG. 10A represents the microstructure of an object formed by a method in accordance with the present disclosure.
Figure 10B:
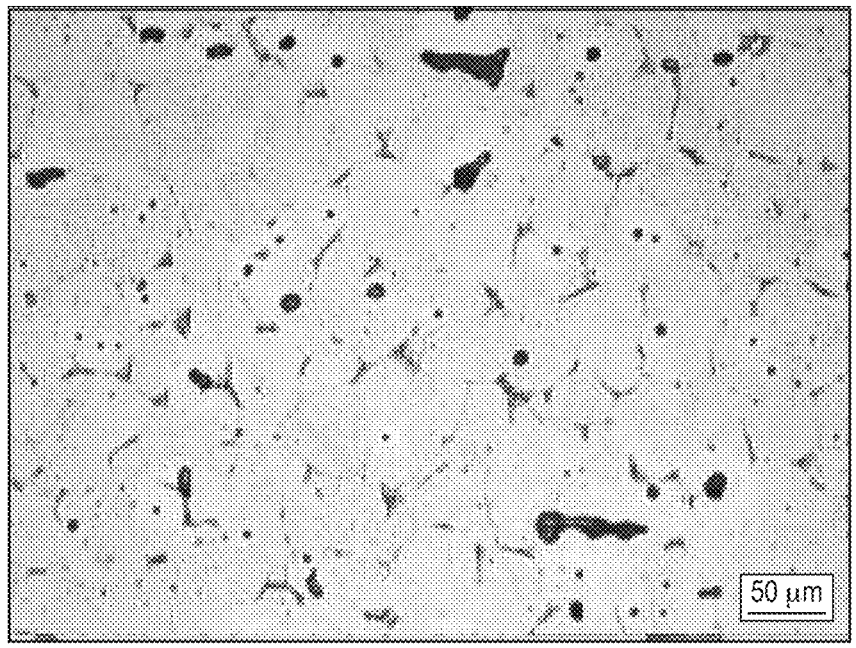
FIG. 10B represents the microstructure of an object formed by a comparative method.

FIG. 10A shows a micrograph of the structure obtained with the process according to the present disclosure. FIG. 10B shows the microstructure obtained according to the process in which the binder infuses the entire object after printing. It can clearly be seen that FIG. 10A exhibits much reduced pore size when compared with FIG. 10B, which is in agreement with an empirically-observed improvement in both static and dynamic strength. Also, the density is increased in FIG. 10A as compared with the situation in FIG. 10B. Following measurements of the microstructure in each case, it has been found that the object from which the sample shown in FIG. 10A was derived exhibited a relative density of 99.7%, whereas the object from which the sample shown in FIG. 10B was derived exhibited a relative density of 97.9%.

When a similar process was undertaken with a powder of Ti6Al4V, in which all parameters were kept the same except that the debinding for Ti6Al4V was undertaken in an inert argon atmosphere and the sintering was carried out at 1350° C., similar results were obtained, with the part produced by infusing binder throughout the whole structure having a relative density of 91%, whereas the part produced by providing binder only in a shell region achieved a relative density of 99.7%.

It can therefore be understood that advantageous effects may be obtained by adopting the approach and concept set forth in the present disclosure.

For large parts, it may be appreciated that even a relatively thick shell exceeding, say, 2 mm will be insufficient to retain the structure of the printed object prior to sintering during handling of the object, due, for example, to the weight and/or mass of the object. Therefore, a further approach may be adopted wherein a shell is printed as disclosed with reference to FIGS. 8 and 9, but that the shell is internally supported by support portions extending across the interior of the shell and being formed by regions which are bound with binder. This can be achieved, for example, by including support portions extending from one side of interior surface 7c of border region 7d shown in FIG. 8 extending to a point on the interior of the shell further away. The internal structure obtained is shown in FIG. 11 for comparison with FIG. 9, in which object 30, which has external surface 30a and shell region 30d ending on an internal surface of the shell 30c and surrounding an unbound region 30b, also exhibits internal support structures 30e traversing the shell so as to provide internal support to the shell.

Figure 11:
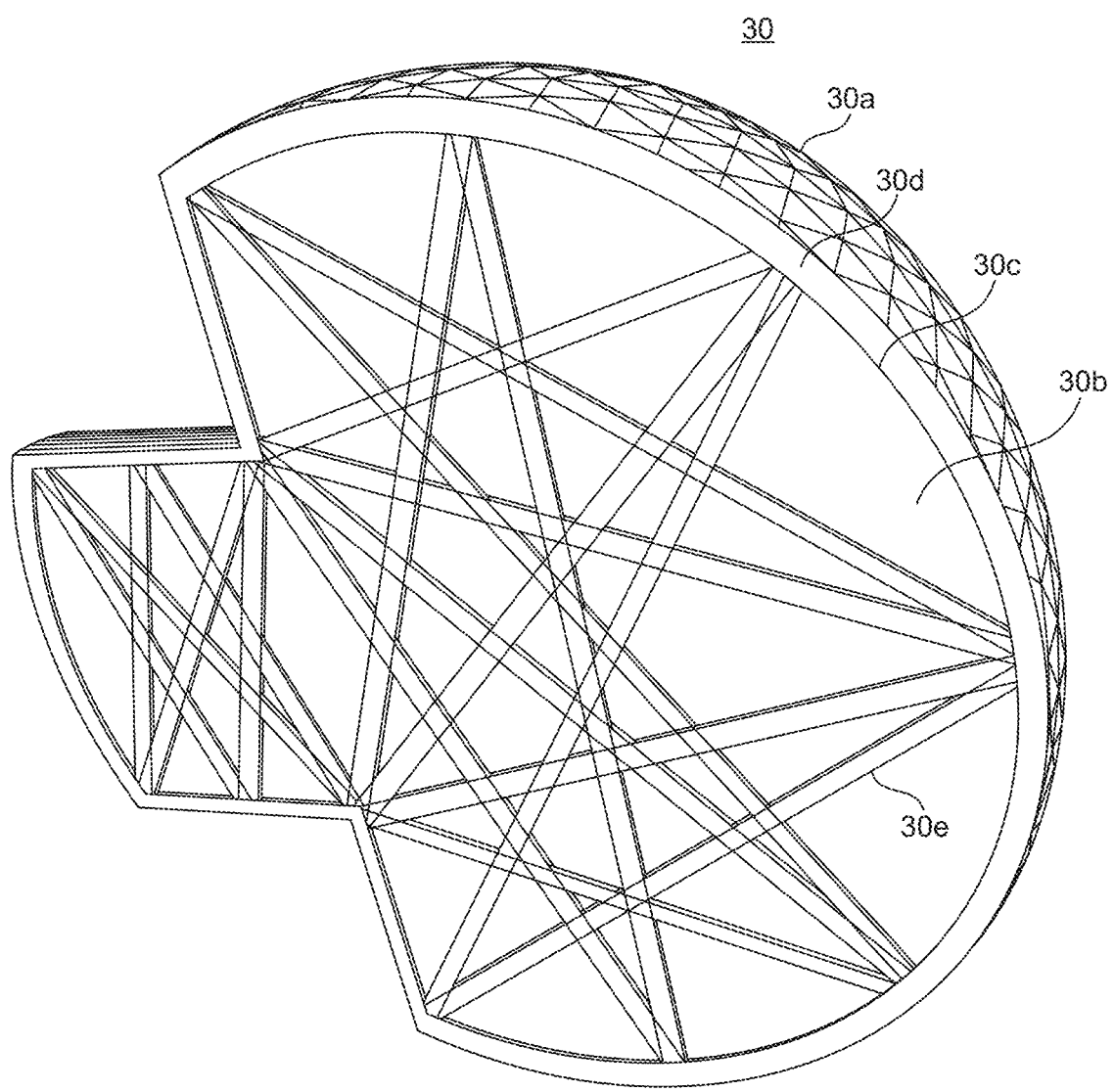
FIG. 11 represents a manufactured object comparable to that represented in FIG. 9, having an alternative internal structural configuration.

In FIG. 11, the internal supports are shown as columnar struts. However, other configurations are possible, including configurations in which the support portions form a mesh of bound material, which may be a three-dimensional mesh, extending across and within the shell. In such a configuration, the mesh may comprise a regular and repeating unit structure, for example a crystalline or cellular structure, while in other configurations the support structures may comprise an irregular structure, such as a fibrous structure.

By adopting a configuration shown in FIG. 11, the shell may be strengthened against external forces while the regions of unbound material extending within the shell and between the internal support structures allows the binder of the support structures to at least partially exfiltrate.

Accordingly, the advantages associated with the structure of FIG. 9 may be at least partially obtained, whilst improving the structure of the object prior to sintering against deformation or damage due to handling or to its own weight or mass.

In some configurations, the binder deposition unit 15b shown in FIG. 1 can be adapted to deposit two different types of binder, and the support structure 30e shown in FIG. 11 may be formed from a different binder to the binder used in the shell 30d. For example, the binder used in the support structures may provide a weaker bond between the particles of the granular construction medium than the binder used in the shell 30d, but may be easier to decompose and/or exfiltrate than the binder used in the shell 30d. In some circumstances, the quantity of binder may vary per unit layer area between the shell and the support structure, such that the support structure may have relatively less volume of liquid binder per unit volume of structure than the shell.

In some configurations, it may be possible to bind at least the construction material forming the support structures 30e by an alternative technique rather than the application of liquid binder, including local sintering by the application of laser energy, local melting by the application of heat, or local photopolymerisation. Alternatively, the shell may be bound by a method other than liquid binding, while the struts 30e are bound by the application of liquid binder.

In the above, it has been described how, by appropriate operation of an additive manufacturing apparatus an object may be manufactured which, when sintered, can achieve improved mechanical properties. Additionally, the concepts herein disclosed can also be used to transform object definition data describing the form of an object to be manufactured such that, when the object described by the data is manufactured on a conventional 3D printing apparatus, the advantageous properties may be achieved.

Figure 12:
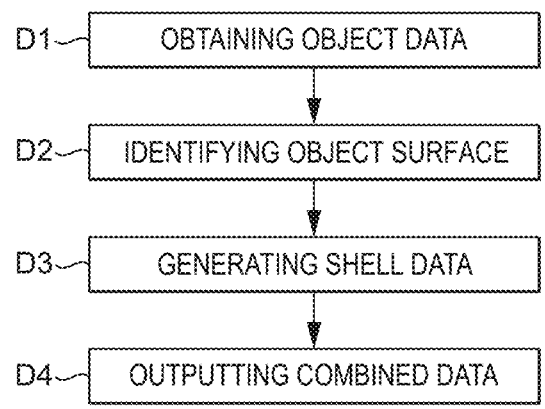
FIG. 12 shows a flow chart representing a method of processing data in accordance with the present disclosure.

One such method for transforming object data will be described with reference to FIG. 12. FIG. 12 shows a flow diagram for a process of transforming object data, which is data describing an object to be manufactured in three dimensions, to obtain data representing the same object but which, when manufactured using a conventional additive manufacturing system, can achieve the improved mechanical properties associated with the present disclosure after sintering.

In a first process D1 shown in FIG. 12, object data is obtained. This object data may be the output of computer aided design (CAD) software, and may represent the object to be manufactured as a series of surfaces enclosing solid portions of the object, may define the object as a composite of a predetermined set of geometrical primitives or may represent the object as a set of voxels defining the object on a raster grid in 3D space. Alternatively, the object data may already be represented as a series of slices through an object, dividing the object into layers, each layer having defined regions to be bound together, such as is conventionally used to control a 3D printing apparatus.

In the method of FIG. 12, the object data representing the object to be manufactured is processed to identify the object surface. This may be achieved by a variety of methods, which may depend on a format in which the input data is provided. For example, for an object which is represented as a composite of various geometrical primitives, the surfaces of those primitives may be identified, and surfaces of those primitives which adjoin or which lie within other primitives may be removed, so as to define an overall surface of the object. For objects represented by a series of surfaces, the series of surfaces may be used to define the surface of the object, again surfaces which lie wholly within solid portions of the object or which adjoin other surfaces being omitted from the surface of the object.

In the case of an object which is defined as a series of slices having regions defined therein to be bound together with binder, an edge detection algorithm can be performed on each slice to determine the edge of each region, and then the edge of each region can be associated with the surface of the object. A similar approach may be taken with objects defined in terms of voxels, or alternatively a mesh-fitting approach may be used to fit a finite element mesh to an external surface of the object to define the surface of the object as such a mesh. The identifying of the object surface may be exact or may be approximate to any desired degree of precision. The identifying of the surface of the object may include transforming between representations of the object to achieve the representation of the object which is most compatible with the technique used to identify the surface of the object.

The object surface data obtained in process D2 is then used in process D3 to generate data representing a shell extending inwardly from the surface of the object and having certain predefined properties. For example, minimum or maximum thicknesses may be attributed to the shell, or the shell may have an exact uniform thickness noted in a direction normal to the object surface. Other approaches to defining the shell may include defining one or more spheres, cubes or other geometrical primitives inside the object so as to achieve certain properties of the shell, and then removing portions of the object which lie within those geometrical objects from the data defining the object.

The data representing the shell is then, in process D4, outputted from the process in a suitable format, such as any of those formats indicated as being suitable for input to the process D1 described previously. In some configurations, especially in configurations in which the output process D4 is used directly to control an additive manufacturing apparatus, the output is provided as a series of pixel images representing sequential layers of the object in which pixels forming part of the shell are distinguished from pixels representing an outside of the object and an unbound interior of the object.

Figure 13:
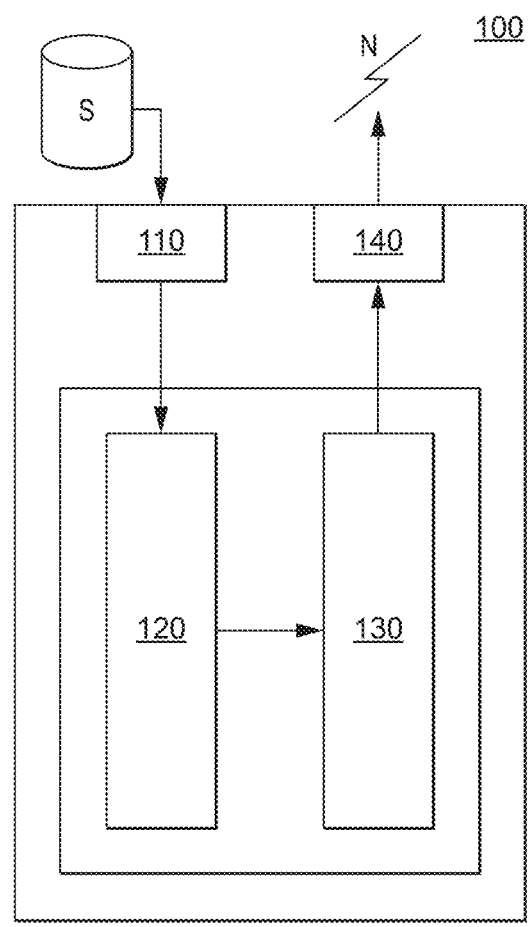
FIG. 13 represents an apparatus for processing object data in accordance with the present disclosure.

The process of FIG. 12 may be implemented in an object data processing apparatus 100 as shown in FIG. 13. System 100 is a data processing apparatus adapted for performing the method of FIG. 12. In FIG. 13, the apparatus 100 is represented by a series of discrete modules. These may be hardware modules, such as discrete microprocessors or data processing units, whether integrated on the same chip, or provided on distinct boards or provided at distinct parts of a larger data processing system. Alternatives of the modules may be provided as software modules running on one or more microprocessors as may be known in the art.

Apparatus 100 has an object data obtaining unit 110 adapted to read object data from a data source, indicated by data storage unit S. However, obtaining unit 110 may also obtain object data from, for example, a network store, a data stream from another data processing unit, or may obtain object data read from, for example, a laser scanner or other object metrology system as may be known in the art.

The object data obtained by obtaining unit 110 is transmitted to surface identification unit 120. Surface identification unit 120 operates on the obtained object data to identify the surface of the object. The data representing the surface of the object is then transmitted from the surface identification unit to the shell generation unit 130, in which the data representing a shell standing inwardly from the surface of the object is generated. The shell data then generated is passed to output unit 140, in which the data is appropriately formatted and outputted. In the example shown in FIG. 13, the object data is output to a network N, but could also be output to a local data store or any other device capable of handling the data. In one variant, the output object data may be used directly to control a manufacturing apparatus as shown and described with regard to FIGS. 1 to 6.

Figure 14:
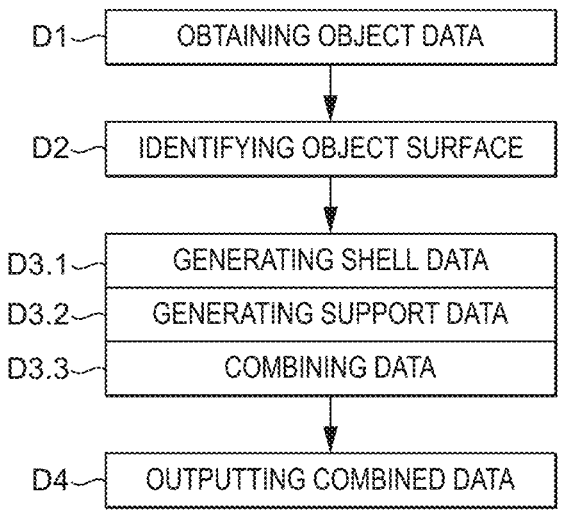
FIG. 14 represents an alternative method of processing object data in accordance with the present disclosure.
Figure 15:
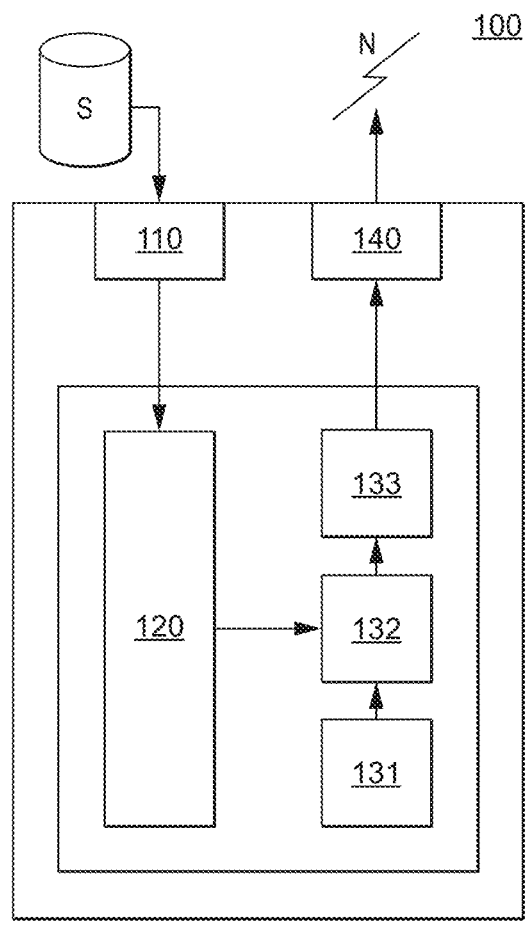
FIG. 15 represents an apparatus for processing object data in accordance with another aspect of the present disclosure.

It is also possible to consider an object data processing method for producing an object which has a bound shell and interior support portions as previously shown and described with regard to FIG. 11. An example of such a process is shown in FIG. 14, and shares common features with the similar process shown and described with reference to FIG. 12. However, rather than a step D3 of generating shell data as shown in FIG. 12, the process of FIG. 14 includes steps D3.1, D3.2 and D3.3 of, respectively, generating shell data, generating support data, and combining data.

In process D3.1 of generating shell data, the equivalent process to that described with reference to process D3 of FIG. 12 is carried out. Then, in step D3.2, data representing an appropriate support structure is generated according to predetermined parameters. For example, a mesh may be generated traversing the interior of the shell, or support columns may be randomly or algorithmically placed to achieve an appropriate degree of support to the interior of the shell. Then, in process D3.3, the shell and the support data are combined to provide output object data. It may in some circumstances be possible to carry out steps D3.1 and D3.2 together, for example by populating the interior of an object with voids which then are enlarged until they reach a minimum distance between themselves and between the external surface of the object.

As disclosed with reference to FIG. 13, the process of FIG. 14 can be implemented in a data processing apparatus 100 which is similar to data processing apparatus 100 shown in FIG. 13 but in which shell data generation unit 130 is replaced with shell data generation unit 131, support data generation unit 132 and data combination unit 133, which, respectively, are adapted to perform the functions of processes D3.1, D3.2 and D3.3, respectively, as disclosed above.

It is also possible for the concepts of this disclosure to be distributed as a software module, either for execution on a general purpose computer or for execution in the control systems of a conventional manufacturing apparatus. In the latter case, especially, conventional object data may be provided by the user of the apparatus, and the manufacturing apparatus itself then acts to identify the surface, generate the shell, and, optionally, support structures and manufacture the object in accordance with the present disclosure. The data processing apparatus may be provided as part of a conventional manufacturing apparatus either as a hardware unit or as software, for example executed in a control unit of the conventional manufacturing apparatus. Such software may be distributed as a data carrier comprising a machine-readable representation of software instructions which, when executed by a suitably-configured processor, cause the processor to perform a method in accordance with the concepts of the present disclosure.

It goes without saying that the above disclosure should be considered purely exemplary, and that the present disclosure may be embodied in a wide variety of configurations, by substitution, variation, omission or addition of various elements so as to achieve various engineering requirements. Accordingly, the appended claims are considered to provide particular combinations of subject-matter which may provide the advantages of the present disclosure.

The invention claimed is:

1. An additive manufacturing method for manufacturing an object comprising:
   depositing successive layers of a construction material;
   selectively binding a first region of each layer to form a bound shell of construction material defining an exterior of the object;
   selectively binding a second region of each layer to form support portions contacting the shell and which function to support the shell against external forces,
   wherein the first regions and the second regions are bound such that the first regions are relatively more strongly bound than the second regions,
   wherein the first regions and the second regions are bound by deposition of liquid binder.

2. The additive manufacturing method according to claim 1, wherein a region of each layer extending between the first region and the second region remains substantially unbound.

3. The additive manufacturing method according to claim 1, wherein the shell is contiguous and defines the exterior of the object.

4. The additive manufacturing method according to claim 1, wherein the first regions are bound with a greater volume of liquid binder per unit layer area than the second regions.

5. The additive manufacturing method according to claim 1, wherein the support portions have the form of columns of bound material extending across and within the shell.

6. The additive manufacturing method according to claim 1, wherein the support portions have the form of a three-dimensional mesh of bound material extending across and within the shell.

7. The additive manufacturing method according to claim 6, wherein the mesh comprises a repeating unit structure that is arranged according to a prescribed rule.

8. The additive manufacturing method according to claim 6, wherein the mesh comprises a structure that is arranged in a manner that fails to conform to a prescribed rule.

9. The additive manufacturing method according to claim 1, further comprising separating the shell and enclosed construction material from construction material remaining outside the shell; and
   elevating the shell and the enclosed construction material to a first temperature at which the shell and the enclosed construction material sinters together to form the object.

10. The additive manufacturing method according to claim 9, comprising, after the shell and the enclosed construction material is separated from the construction material remaining outside the shell and before the shell and the enclosed construction material is elevated to the first temperature, debinding the bound regions of construction material in a debinding process conducted at a second temperature lower than the first temperature.

11. The additive manufacturing method according to claim 1, wherein the first regions and the second regions are bound by a common binding method.

12. The additive manufacturing method according to claim 1, wherein the first regions and the second regions are bound by respectively different binding methods.

* * * * *